United States Patent
Balinsky et al.

(10) Patent No.: US 9,703,606 B2
(45) Date of Patent: Jul. 11, 2017

(54) WORKFLOW TERMINATION DETECTION AND WORKFLOW RECOVERY

(75) Inventors: Helen Y Balinsky, Cardiff (GB); Liqun Chen, Bristol (GB); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1535 days.

(21) Appl. No.: 13/361,891

(22) Filed: Jan. 30, 2012

(65) Prior Publication Data
US 2013/0198255 A1  Aug. 1, 2013

(51) Int. Cl.
*G06F 15/173* (2006.01)
*G06F 9/50* (2006.01)
*H04L 12/721* (2013.01)

(52) U.S. Cl.
CPC ............ *G06F 9/5038* (2013.01); *H04L 45/44* (2013.01)

(58) Field of Classification Search
CPC .................................. H04L 9/32; H04L 45/44
USPC .................................................. 709/316, 239
See application file for complete search history.

(56) References Cited

U.S. PATENT DOCUMENTS

| | | | |
|---|---|---|---|
| 6,584,466 B1* | 6/2003 | Serbinis .............. | G06F 17/3089 707/754 |
| 7,389,473 B1* | 6/2008 | Sawicki ................ | G06F 17/211 715/237 |
| 7,792,961 B2* | 9/2010 | Sun ...................... | G06F 11/1438 709/203 |
| 7,974,939 B2 | 7/2011 | Nanjangud Bhaskar et al. | |
| 2003/0217264 A1* | 11/2003 | Martin ................ | G06F 21/6209 713/156 |
| 2005/0091261 A1* | 4/2005 | Wu ......................... | G06F 21/64 |
| 2005/0188016 A1* | 8/2005 | Vdaygiri ................ | G06Q 10/10 709/205 |
| 2008/0255909 A1* | 10/2008 | Joshi ...................... | G06F 9/5038 705/7.13 |
| 2010/0268568 A1 | 10/2010 | Ochs et al. | |
| 2013/0031369 A1* | 1/2013 | Balinsky ............. | G06F 21/6209 713/176 |

OTHER PUBLICATIONS

Eder, Johann, et al., Workflow Recovery, CSE-Systems, Computer & Software Engineering GmbH, Klagenfurt, Austria, 1996, 11 pgs.
Hollingsworth, D., Workflow Management Coalition the Workflow Reference Model, The Workflow Management Coalition, Doc. No. TC00-1003, Issue 1.1, Jan. 19, 1995, 55 pgs.

* cited by examiner

*Primary Examiner* — Kevin Bates
*Assistant Examiner* — Emad Siddiqi
(74) *Attorney, Agent, or Firm* — Wagner Blecher, LLP

(57) ABSTRACT

Detecting a workflow termination. An object with embedded access control is sent to a next participant in a workflow, wherein the embedded access control is provided and enforced by placing a subset of access keys for individual content-parts into a unique key-map entry for each participant, wherein the object is a Publicly Posted Composite Document. A workflow termination is detected after failure to receive a confirmation token from the next participant after a specified condition is not met.

17 Claims, 3 Drawing Sheets

PROCESS
300

UPON DETECTION OF A WORKFLOW TERMINATION AT A DEVICE ASSOCIATED WITH A FIRST PARTICIPANT, AN OBJECT MASTER IS NOTIFIED OF SAID WORKFLOW TERMINATION
302

AN AMENDED WORKFLOW IS RECEIVED FROM SAID OBJECT MASTER
304

AN OBJECT IS SENT, FROM SAID DEVICE, TO A NEXT PARTICIPANT LISTED IN SAID AMENDED WORKFLOW IN RESPONSE TO A COMMAND FROM SAID FIRST PARTICIPANT
306

FIG. 3

WORKFLOW TERMINATION DETECTION AND WORKFLOW RECOVERY

BACKGROUND

Over the last decade, business document complexity has increased dramatically. New generation documents have changed from single, monolithic files into complex bundles composed of differently-formatted files and file fragments inter-connected and logically linked. Through coherent styles, references, inclusions, and various navigation means, these web-portal-like composites are still presented to end users as single coherent and monolithic documents.

BRIEF DESCRIPTION OF THE DRAWINGS

FIG. 3 illustrates a flowchart of an example method for recovering a workflow in accordance with examples of the present technology.

Figure 1:
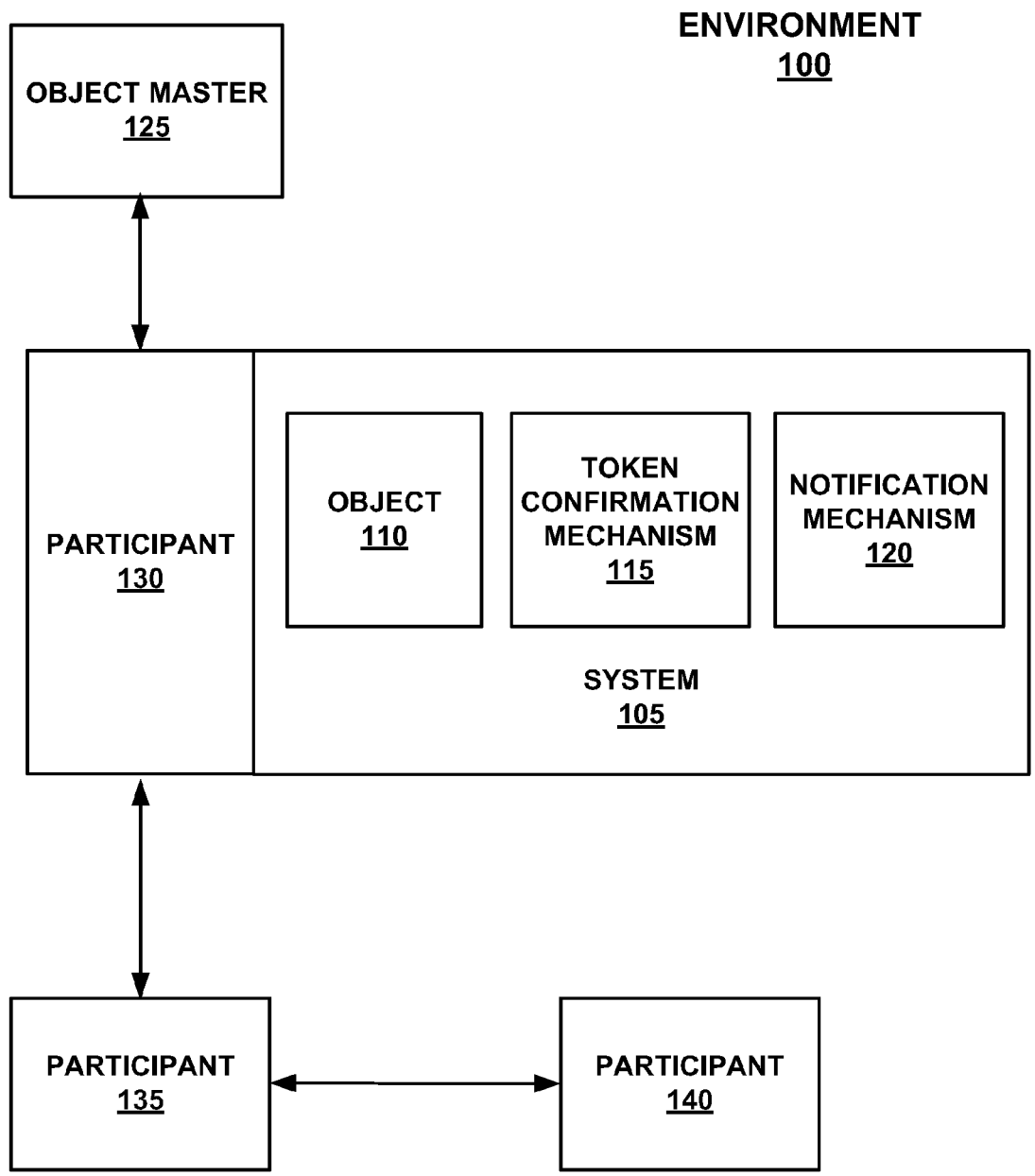
FIG. 1 illustrates a block diagram of an example environment for workflow termination detection and workflow recovery in accordance with examples of the present technology.

The drawings referred to in this description of examples should be understood as not being drawn to scale except if specifically noted.

DESCRIPTION OF EMBODIMENTS

Reference will now be made in detail to examples of the present technology, examples of which are illustrated in the accompanying drawings. While the technology will be described in conjunction with various example(s), it will be understood that they are not intended to limit the present technology to these examples. On the contrary, the present technology is intended to cover alternatives, modifications and equivalents, which may be included within the spirit and scope of the various examples as defined by the appended claims.

Furthermore, in the following description of examples, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present examples.

Unless specifically stated otherwise as apparent from the following discussions, it is appreciated that throughout the present description of examples, discussions utilizing terms such as "sending", "detecting", "notifying", "receiving", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

Overview of Discussion

New generation documents have grown from single, monolithic files into complex bundles composed of differently-formatted files and file fragments inter-connected and logically linked. Such a complex bundle may be described as an object or a publicly posted composite document. These documents may be sent from one participant to the next. Each participant may edit and perform different combinations of editing operations regarding the object such as reviewing, adding or removing files, auditing, making changes, etc. The object moving from participant to participant is known as a workflow. The workflow may be ordered wholly sequential or ordered in series. The workflow may also be unordered containing parallel, or branching operations, or may have alternative orders or be a combination thereof.

The workflow may take place with participants from different organizations or enterprises and may occur over non-secure channels. As such, it is desirable to maintain specific access control over the object as it moves through the workflow. Such control over the object may be differential, changing and/or policy-based access control. In one example, access control is maintained by encrypting the object such that it may only be accessed by the participants in proper order of the workflow. In other words, a second participant cannot access the document until the first participant has accessed the document, thereby enabling the decryption of the document by the second participant after the first participant has sent it onward. In one example, access control is maintained by providing variable data access to the object dependent on the participant.

The absence of a centralized service to enforce the desired access control and workflow order turns managing such workflows into an incredibly difficult task. A composite document needs to be partitioned according to each participant's granted access rights. Each part must then be securely, timely and independently communicated to the corresponding participants, and the received feedback assembled. This will inevitably result in some labor intensive merger of all individual disparate contributions, substantial time delays in the workflow completion, and potentially the absence of some vital information when and where it is needed. Most dauntingly, this introduces increased potential for human errors.

Shipped over a potentially non-secure channel, the object might never be received by the next workflow participant, thus causing the workflow to terminate silently. A recipient may receive an object document that failed verification tests and so was discarded, perhaps assumed to be spam. An object could, alternatively, be mistakenly shipped to an incorrect workflow participant or even to a random email address. A workflow may silently terminate as a result of one of the workflow participants just being ill, out of office or otherwise unexpectedly unavailable.

In one example, workflow detection is accomplished using token confirmations. This provides a change in protocol to the workflow such that a participant has not completed their step in the workflow until the object is sent to the next participant and a token confirmation is received by the participant that the next participant has received the object. In one example, a mechanism for automatic token confirmation is received such that the participants may not even be aware that the token is sent or may just get an automatic acknowledgement or required to authorize/release of sending the token.

In one example, when a workflow termination is detected, an object master is notified. The object master has the ability to amend the workflow order such that the next participant is replaced or removed and the last participant that successfully accessed the object prior to termination can send the object to the next participant in the amended workflow order. Thus, the delays due to workflow termination are overcome or minimized.

The following discussion will demonstrate various hardware, software, and firmware components that are used with and for workflow termination detection and workflow recovery. Furthermore, the devices, computer systems and their methods may include some, all, or none of the hardware, software, and firmware components discussed below.

Embodiments of Workflow Termination Detection and Workflow Recovery

With reference now to FIG. 1, a block diagram of an example environment for workflow termination detection and workflow recovery is shown in accordance with examples of the present technology. Environment 100 comprises components that may or may not be used with different examples of the present technology and should not be construed to limit the present technology.

In one example, system 105 is a computer system or other device used for sending and receiving electronic documents. System 105 is depicted comprises object 110, token confirmation mechanism 115, and notification mechanism 120. System 105 is depicted as being associated with participant 130 wherein participant 130 is a workflow participant where the workflow comprises object master 125, participant 130, participant 135, and participant 140. In one example, each workflow participant is associated with a system similar to system 105. The systems associated with workflow participants may be employed to send and receive the object as well as confirmation tokens and other messages. The object can be send by any available or suitable channel.

In one example, object 110 is an electronic file or a plurality of electronic files serialized into a single file that may refer to Hewlett-Packard Development Company's Publicly Posted Composite Document (PPCD). Object 110 may comprise files of different formats and types as its content—parts or simply parts. In one example, object 110 comprises a key-map, a separate entry in a PPCD, containing a subset of access keys for individual content-parts. Each key-map is individually encrypted to be recoverable by a particular participant thus allowing access to content-parts of object 110 upon ability to decrypt a key-map entry associated with a participant, thus recovering access key to content-parts (also individually encrypted).

In one example, object 110 is a serialization that has a plurality of content parts with one entry for each individually accessible content part and each part is individually encrypted and then signed by its own specially generated or assigned encryption and signature keys. Different content parts could be different files such as electronic text documents, electronic photos, spreadsheets, etc. Subsets of access keys for individual parts corresponding to the access granted to each particular participant are assembled into a corresponding key-map. One key-map entry exists for each workflow participant; for unordered or branched workflows these entries are accessible directly at the top level of PPCD serialization, whilst for ordered or sequential workflows they are combined into a Workflow Wrap. For unordered workflows, the entry-table is also provided for fast identification of the individual key-map entries by each workflow participant. This is especially beneficial for large unordered workflows and/or to documents with many content parts.

In one example, the access control for a composite document part i is enabled by 4 keys: $\{\{E_i, D_i\}, \{S_i, V_i\}\}$, where $\{E_i, D_i\}$ is a pair of encryption and decryption keys, $\{S_i, V_i\}$ is a pair of signature and verification keys. An individual part within the workflow context can be accessible for read only (RO), read write (RW) or no access (NA) granted. Read only (RO) access is controlled by the participant's having or not having the decryption key $D_i$. Read and write (RW) access requires three keys $E_i, D_i, S_i$. An item will be decrypted using $D_i$, modified as needed, encrypted using $E_i$ and then signed using $S_i$. A workflow participant with no access (NA) granted for a particular part is given no $E_i, D_i, S_i$ keys for this part. However, as he is expected to receive and ship such an inaccessible part within the document, the part authenticity must be established. Thus, every part of a composite document is signed by its own signature key $S_i$ and every workflow participant is securely given (within his key-map file) the corresponding signature verification key $V_i$ for each part, irrespective of the type of granted access. Upon reception, it is mandatory that every workflow participant verifies the signature of every part using the corresponding signature verification key.

For each workflow participant, the subset of keys corresponding to his granted access is combined into the individual key-map entry. Key-map entries are also individually encrypted and signed, such that each workflow participant, using his private decryption key, is only able to access his key-map entry. For ordered workflows, access to an individual key-map entry is further restricted by a workflow wrap: it is accessible at one's workflow step only. Key-map entries and workflow wraps are signed by the document master signature key, and unlike parts they are not authorized for modifications during a workflow.

A workflow termination can occur at any workflow step. To minimize and localize workflow failures, each document transition must be properly confirmed and acknowledged. Obviously, there is a sender-receiver pair for every object transition, and every workflow participant plays both roles in the same workflow: first as an object receiver and then as an object sender. Due to the flexible nature of object workflows, some workflow participants are likely to be unaware of the exact or actual time when the document should be received. This makes it hard or even impossible on the receiver's end to detect a potential workflow termination due to a document simply not being delivered. In one example, participant 130 receives object 110 from object master 125 and acts as the object sender to send object 110 to participant 135. Participant 135 may then act as the object sender to send object 110 to participant 140. At each step, the present technology operates to determine if there has been a premature silent workflow termination. It should be appreciated that system 105 may be employed by participant 130 to send and receive object 110.

The present technology operates to change workflow protocol such that responsibility for object transition lies with the object sender at each workflow step. The object sender will need to seek reliable confirmation that the sent object was received by the subsequent workflow participant in authentic form. If such information has not been received within some specified period of time, the workflow recovery procedure (WRP) should be automatically followed. In one example, token confirmation mechanism 115 is an automated mechanism to automatically send a confirmation token of receipt of object 110 once object 110 has been received by participant 130. The confirmation token is automatically sent to the participant that sent the document. For example, if object master 125 send object 110 to participant 130, then token confirmation mechanism 115 will send the confirmation token to object master 125 upon receipt of object 110. It should be appreciated that this step may take place between any two workflow participants sending and an object and does not require that the object master be a sender or receiver of the object. Additionally the confirmation token at each step could be sent to the object master/owner for workflow progress monitoring.

The object workflow may include the following steps for a transition to take place between a sender and receiver:

1. Object senders and receivers need to be alerted to the fact that every document transition must be formally acknowledged.

2. To accomplish the workflow step, the sender is now required to verify the document transition confirmation token obtained from the document receiver.

3. If the confirmation token failed its verification or was not received by the sender within the specified period of time or after a specified number of attempts, the sender must follow the workflow recovery procedure.

4. Upon receiving a valid confirmation token, the object sender completes the workflow step.

5. In one example, workflows might require the sender to retain a copy of the shipped document together with a transition confirmation token for future audits. The special confirmation token might need to be shipped to object master 125.

In one example, confirmation tokens may be electronic and may be automatically sent without a user being aware that the confirmation token has been sent or the user just being passively notified. For example, object 110 may be encoded such that the confirmation token is sent once object 110 is opened by participant 130 on system 105. It should be appreciated that that the following confirmation tokens or checkpoints may or may not be used in examples of the present technology; 1. Prove to the object sender that the object was received by the correct workflow participant. The sender can only be assumed to know the object shipment address of the receiver. 2. Provide the object sender with verifiable (auditable) proof that the object was transferred to the correct workflow participant; it might also include a secure timestamp. 3. Prevent the object receiver from denying that the object was received. 4. Prove that the object was received in its authentic form—exactly as it was shipped by the sender.

In one example, to prove that the object was received by the correct workflow participant, the shared secret/one time nonce can be placed into the key map-files of the sender and receiver for each transition. Note that the nonce must be random and long enough to be neither guessable nor derivable from any other transmission confirmations of objects.

In one example, the transmission verification process may be as follows. A sender recovers the transmission token during the workflow step, and retains it. Upon receiving the document, the next workflow participant recovers the confirmation token and ships it to the sender by any available or specified workflow channel or even multiple channels. The sender compares the received and recovered nonces. This may be accomplished automatically using hardware and software. If they match, the transition is successfully accomplished.

If the confirmation token has not been received by the sender within the predefined period of time, then the transition may be repeated again according to the workflow specified recovery steps. However, if within the workflow specified period of time the sender has not received a valid confirmation, the workflow recovery procedure can be started. 'Matching nonces' is a very computationally simple solution that puts nearly no overhead on the document workflow and only adds a generation of one random nonce per one workflow step during object creation. 'Matching nonces' is also insensitive to spoofing, since the nonce is hard to guess, and the comparison is done through a linear binary stream comparison operation.

In one example, a pair of complementary keys is used. The document receiver retrieves his signature key for the transaction from his key-map file and signs the received document. Then the generated signature is shipped back to the sender. The sender retains the copy of shipped document and the retrieved verification key, so he verifies that the received signature is valid for the copy of his document using his verification key. If the signature verifies, this proves that the intended receiver received the document and that the document was received exactly as shipped. The signature received by the sender might be further retained. Unlike matching nonces, such signatures can serve as an auditable proof that the document (the copy of which might also be retained by the sender) was shipped and received by the intended participant.

In one example, a new pair of signature-verification keys can be generated for each document transaction, with the signature/verification key given to the transaction receiver/sender accordingly in their key-map entries.

The document receiver retrieves his transaction confirmation key, signs the received document and ships only the signature. By this means, the sender has an authentic copy of the document. The sender verifies the signature using his transaction verification key. As before, if needed, the document and the signature can be re-sent a few times without jeopardizing security.

This example comes at a price: a new pair of signature-verifications keys needs to be generated for every document transition, which is computationally more expensive than just generating a random nonce. Also, instead of the simple comparison of the recovered and received nonces, the composite document needs to be signed and the signature verified at every workflow transition. However, if the shipped document and its received signature are retained, this example offers verifiable and auditable proof to the sender.

Apart from being computationally more expensive, this example offers a relatively cumbersome post-workflow audit opportunity, fully relying on every participant retaining his copy of the document with its received signature. Even if the signatures generated by the senders were retained within the document itself, they would not be verifiable at later stages: the document parts are changing as the document propagates along its workflow.

In one example, depending on temporal document sensitivity, the log-entry records can be added with or without a secure timestamp. To ensure the timely completion of a document workflow, its participants may be given individual deadlines to meet in either absolute date and time, e.g. May 23, 2012, 2 pm GMT, or relative to their reception points, e.g. within 5 days. To prove that such deadlines were met, workflow participants may be required to secure timestamp documents using 3rd party services, such as for example Universign time stamping service, or a trusted service run by the document master.

It should be appreciated that workflows may occur using a variety of ordered participants. FIG. 1 can be used to describe various workflows. In one example, an ordered workflow is defined by an object being sent from object master 125 to participant 130, then to participant 135, and then to participant 140. In one form, an object in an ordered workflow cannot be sent to a participant out of order; meaning that participant 130 cannot send the object to participant 140. This access control can be maintained by employing object encryption. In an unordered workflow, participant 130, participant 135, or participant 140 may send to the object to any other participant. An alternative workflow may be described where a first participant sends the object to a second participant where the second participant can be chosen from a list of potential second participants, but then the object must be sent from the second participant to a specified third participant. An ordered workflow may be either sequential or in series, an unordered workflow may be either branching or parallel, and an alternative workflow may be sequential-parallel, parallel-sequential, etc. A mixed workflow can combine elements of ordered, unordered and alternative workflows.

Once a workflow termination is detected, the present technology may operate to recover the workflow. In an object workflow, there may be an object or document master. The object master may design the workflow order, determine access control for participants, and may have the authority to amend the workflow order during the execution of the workflow. The object master may be a person or may be a combination of hardware and software. In one example, the object master determines how to recover the workflow. For example, an object master may directly contact a participant who failed to send a confirmation token to the previous participant. In one example, the object master amends the workflow order. In one scenario, a first participant fails to detect a confirmation token from a second participant during a predetermined length of time and thus notifies the document master of the workflow termination. The object master then amends the workflow with instructions for the first participant to send the object to a third participant. The second participant may simply be removed from the workflow order, or the second participant may be replaced by a participant that was not previously included in the workflow order.

In one example, the first participant resends the object to the second participant and then receives a confirmation token to recover the workflow. In such a scenario the workflow is in not considered terminated is removed as the second participant acknowledged receipt of the object.

In one example, notification mechanism 120 automatically notifies object master 125 upon failure of receiving a confirmation token from participant 135. It should be appreciated that that notification mechanism 120 may be an automated process comprised of hardware and software. The predetermined length of time for determining workflow termination can vary for different sender/receiver pairs. The predetermined length of time can be established by the object master in the workflow order or the workflow protocol.

The object master, once alerted to the workflow termination, might be able to establish direct contact with an otherwise a non-responsive participant and thus resurrect or recover the workflow. If this is impossible, the object master can provide an extra package to amend the PPCD workflow or unlock pre-built in functionality. There are a few options that can occur. Here are two possibilities:

1. Dropping a non-available workflow participant i and transferring the document to participant (i+1): 1.1. Providing the (i−1)th participant with verification keys for the following step, $V_{i+1}$, and the new document transmission address and informing him of the appropriate mechanism for this transition (could be different from the original). 1.2. Releasing key-map entry for the (i+1)th participant if it is not accessible (in ordered workflow steps) 1.3. Informing the (i+1)th participant to accept the document from the (i−1)th participant and instructing him to return the transaction id generated to the (i−1)th participant.

2. Replacing a non-available workflow participant i by a new participant: 2.1. Providing the (i−1)th participant with the new shipment address for the document. 2.2. Providing the (i−1)th participant with the updated version of his key-map file containing new verification key for the transition or if there some spare keys were provided within his key map file—inform him that the next key will now be used. 2.3. Generating key-map file for the new i* participant. 2.4. Shipping this key-map file to the i-participant together with the new updated entry-table and corresponding signatures. 2.5. Shipping 3) and 4) either to the (i−1)th participant or directly to the i* participant.

Operation

More generally, operations or methods are described for examples in accordance with the present technology, workflow termination detection and workflow recovery. Such methods can be implemented using computer systems and networks.

Figure 2:
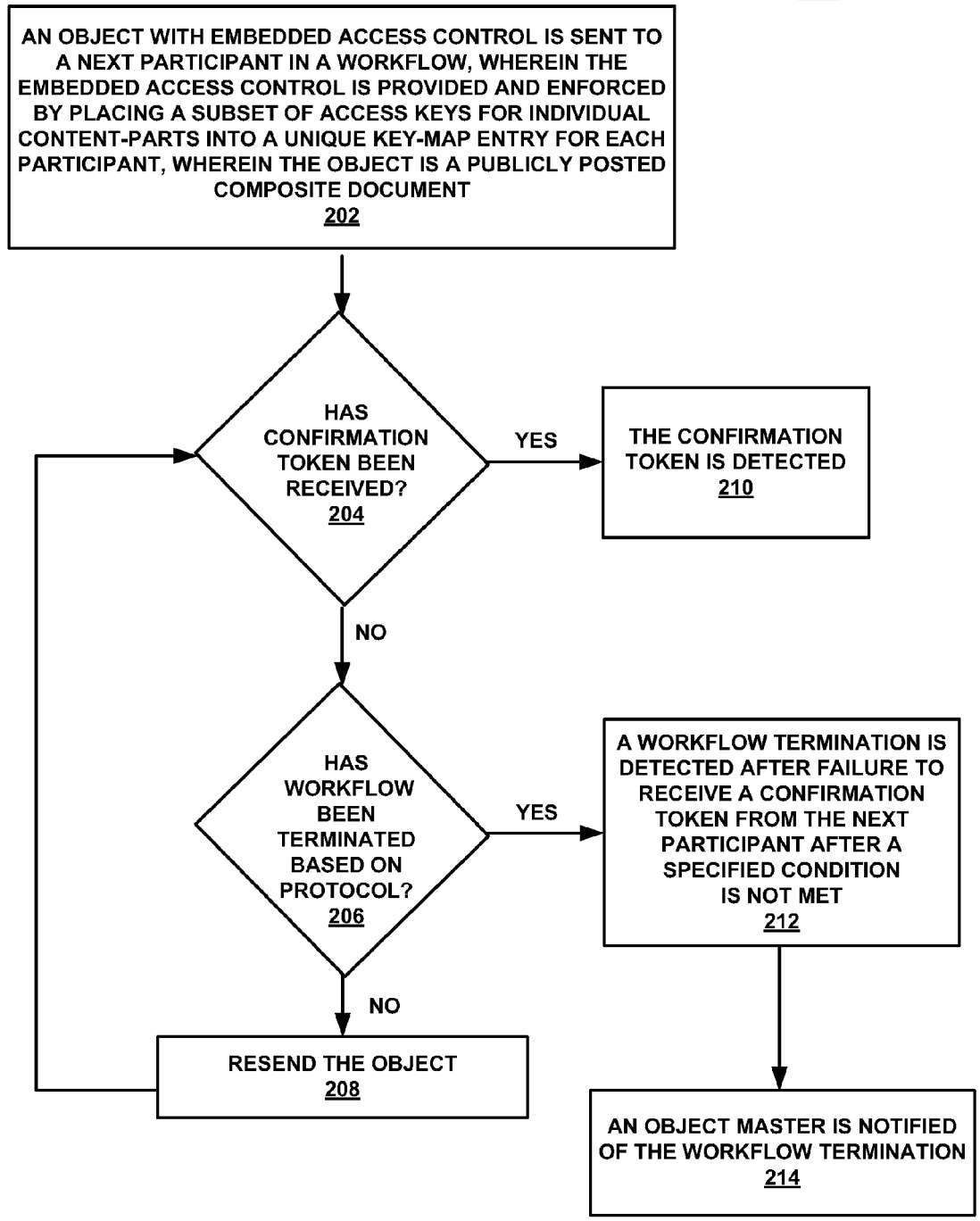
FIG. 2 illustrates a flowchart of an example method for detecting a workflow termination in accordance with examples of the present technology.

FIG. 2 is a flowchart illustrating process 200 for detecting a workflow termination, in accordance with one example of the present technology. In one example, process 200 is carried out by processors and electrical components under the control of computer readable and computer executable instructions stored on a non-transitory computer-usable storage medium. The computer readable and computer executable instructions reside, for example, in non-transitory data storage features such as computer usable volatile and non-volatile memory. However, the computer readable and computer executable instructions may be non-transitory and may reside in any type of computer-usable storage medium. In one example, process 200 is performed by environment 100 of FIG. 1.

In one example, process 200 is used to detect a workflow termination. It should be appreciated that the steps of process 200 may not need to be executed in the order they are listed in. Additionally, examples of the present technology do not require that all of the steps of process 200 be executed to detect a workflow termination.

At 202, an object with embedded access control is sent to a next participant in a workflow, wherein the embedded access control is provided and enforced by placing a subset of access keys for individual content-parts into a unique key-map entry for each participant, wherein the object is a Publicly Posted Composite Document. In one example, the object is an electronic document electronically sent and received between computer systems. The object may be sent over a non-secure channel. The object may be sent to participants that are associated with different organizations or enterprises.

At 204, it is determined whether the confirmation token has been received. If yes, then proceed to 210. If no, then proceed to 206.

At 206, it is determined whether the workflow has been terminated based on protocol or a rule. For example, the protocol or rule may require that the message be re-sent a specific number of times before the workflow is considered terminated. The protocol or rule may also employ other factors such as the length of time that has passed since the object was sent. If the workflow is not terminated, then proceed to step 208. If the workflow has been terminated, then proceed to step 212.

At 208, the object is resent. In one example, the object is resent by repeating step 202 based on a rule or protocol when a confirmation token has not been received by the object sender after a period of time or based on some other factor. Additionally, step 202 may be repeated a plurality of times based on the rule or protocol.

At 210, the confirmation token is detected. The confirmation token may be manually detected or may be automatically detected by a computer system. Such an automatic detection operates such that the participant is not required to personally monitor for the confirmation token. In one example, if the confirmation token is not automatically detected after a pre-determined amount of time, the participant is notified that the confirmation token has not been received. In one example, such an automatic detection occurs without a workflow termination being detected. After the confirmation token is detected, the sender is not required to perform any additional steps to complete the protocol.

At 212, a workflow termination is detected after failure to receive a confirmation token from the next participant after a specified condition is not met such as after a pre-determined amount of time has passed or other control parameter, e.g. after the sender attempted to send a plurality of times or some other constraint or condition that was not met. In one example, the confirmation token may be automatically sent by a computer system upon the object being opened at the computer system. In one example, the workflow termination is automatically detected. In one example, the object is re-sent to the next participant. The re-sending may be in response to the workflow termination detection or in response to instructions from an object master.

At 214, an object master is notified of the workflow termination. Such a notification may occur automatically by a computer system or other device that was used to send the object to the next participant.

FIG. 3 is a flowchart illustrating process 300 for recovering a workflow termination, in accordance with one example of the present technology. In one example, process 300 is carried out by processors and electrical components under the control of computer readable and computer executable instructions stored on a non-transitory computer-usable storage medium. The computer readable and computer executable instructions reside, for example, in non-transitory data storage features such as computer usable volatile and non-volatile memory. However, the computer readable and computer executable instructions may be non-transitory and may reside in any type of computer-usable storage medium. In one example, process 300 is performed by environment 100 of FIG. 1.

In one example, process 300 is used to recovery from a workflow termination. It should be appreciated that the steps of process 300 may not need to be executed in the order they are listed in. Additionally, examples of the present technology do not require that all of the steps of process 300 be executed to recover from a workflow termination.

At 302, upon detection of a workflow termination at a device associated with a first participant, an object master is sent a notification of the workflow termination by the device associated with the first participant. Such a notification may occur automatically by a computer system or other device that was used to send the object to by the first participant. The object may be a publicly posted composite document.

At 304, an amended workflow is received from the object master. An amended workflow may have instructions for the first participant to resend the object or to send the object to a different participant. The amended workflow may include key map entries for the next participant. The amended workflow may either replace or remove a participant. The amended workflow may contain sending information for the next participant such as an address to send the object to.

At 306, an object is sent, from the device, to a next participant listed in the amended workflow in response to a command from the first participant. The receiving, sending and notifying may occur over non-secure channels and the participants may be associated with more than one organization or enterprise.

Example Computer System Environment

Portions of the present technology are composed of computer-readable and computer-executable instructions that reside, for example, in computer-usable media of a computer system. Described below is an example computer system or components that may be used for or in conjunction with aspects of the present technology.

It is appreciated that that the present technology can operate on or within a number of different computer systems including general purpose networked computer systems, embedded computer systems, routers, switches, server devices, user devices, various intermediate devices/artifacts, stand alone computer systems, mobile phones, personal data assistants, televisions and the like. The computer system is well adapted to having peripheral computer readable media such as, for example, a floppy disk, a compact disc, and the like coupled thereto.

The computer system includes an address/data bus for communicating information, and a processor coupled to bus for processing information and instructions. The computer system is also well suited to a multi-processor or single processor environment and also includes data storage features such as a computer usable volatile memory, e.g. random access memory (RAM), coupled to bus for storing information and instructions for processor(s).

The computer system may also include computer usable non-volatile memory, e.g. read only memory (ROM), as well as input devices such as an alpha-numeric input device, a mouse, or other commonly used input devices. The computer system may also include a display such as liquid crystal device, cathode ray tube, plasma display, and other output components such as a printer or other common output devices.

The computer system may also include signal generating and receiving device(s) coupled with a bus for enabling the system to interface with other electronic devices and computer systems. Signal generating and receiving device(s) of the present example may include wired serial adaptors, modems, and network adaptors, wireless modems, and wireless network adaptors, and other such communication technology. The signal generating and receiving device(s) may work in conjunction with communication interface(s) for coupling information to and/or from the computer system. A communication interface may include a serial port, parallel port, Universal Serial Bus (USB), Ethernet port, antenna, or other input/output interface. A communication interface may physically, electrically, optically, or wirelessly (e.g. via radio frequency) couple the computer system with another device, such as a cellular telephone, radio, or computer system.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A non-transitory computer-usable storage medium having instructions embodied therein that when executed cause a computer system to perform a method for recovering a workflow termination, the method comprising:
    sending an object with embedded access control, the object partitioned according to granted access rights of each participant in a workflow of different combinations of editing operations wherein the embedded access control is provided by encrypting the object for variable data access to the object dependent on each participant and enforced by placing a subset of access keys for individual content-parts into a unique key-map entry for each participant wherein access to the unique key-map entry is accessible at each respective participant workflow step only, from a workflow participant to a next participant in the workflow wherein the workflow participant and the next participant are not part of an object master of the workflow, wherein the object master is not a sender or receiver of the object, wherein responsibility for object transition lies with the workflow participant, and wherein the object is a Publicly Posted Composite Document composed of differently-formatted files and fragments inter-connected and logically linked;
    detecting by the workflow participant a workflow termination after failure to receive a confirmation token from the second participant after a specified condition is not met;
    upon detection of the workflow termination at a device associated with the workflow participant, notifying the object master of the workflow termination using token confirmation for workflow progress monitoring;
    receiving an amended workflow from the object master; and
    sending an object, from the device, to a second next participant listed in the amended workflow in response to a command from the workflow participant.

2. The non-transitory computer-usable storage medium of claim 1, further comprising:
    detecting a successful transition of the object along the workflow by the workflow participant in response to receiving the first confirmation token from the next participant.

3. The non-transitory computer-usable storage medium of claim 1, further comprising:
    notifying a prior workflow participant upon the detecting the workflow termination.

4. The non-transitory computer-usable storage medium of claim 1, further comprising:
    notifying the object master of the workflow termination with verifiable and auditable proof that the object was transferred to a correct next participant in the second confirmation token.

5. The non-transitory computer-usable storage medium of claim 1 wherein the confirmation token is automatically sent from a computer system associated with the next participant upon the object being open.

6. The non-transitory computer-usable storage medium of claim 1 wherein the confirmation token is manually triggered and sent from a computer system associated with the next participant upon the object being open.

7. The non-transitory computer-usable storage medium of claim 1 wherein the workflow participant and the next participant are associated with different organizations.

8. The non-transitory computer-usable storage medium of claim 1 wherein the sending occurs over a non-secure channel.

9. The non-transitory computer-usable storage medium of claim 1 wherein the workflow is unordered.

10. The non-transitory computer-usable storage medium of claim 1 wherein the amended workflow replaced the next participant with the second next participant.

11. The non-transitory computer-usable storage medium of claim 1 the amended workflow removed the next participant.

12. The non-transitory computer-usable storage medium of claim 1 wherein the object is associated with a key-map that requires a unique key-map entry from each participant to access the object.

13. The non-transitory computer-usable storage medium of claim 12 wherein the workflow is ordered and access to the object is controlled by the key-map such that the workflow participant may only access the object in order.

14. The non-transitory computer-usable storage medium of claim 12 wherein sending the object with the key-map to the next participant is repeated if the confirmation token is not received after a pre-determined amount of time.

15. The non-transitory computer-usable storage medium of claim 12 wherein the amended workflow comprises an amended key-map that allows the second next participant to access the object after the workflow participant.

16. The non-transitory computer-usable storage medium of claim 1 wherein the amended workflow comprises sending information regarding the second next participant which is not the next participant.

17. The non-transitory computer-usable storage medium of claim 1 wherein the notifying, the receiving, and the sending occurs over non-secure channels.

* * * * *